Patented Jan. 15, 1952 2,582,590

UNITED STATES PATENT OFFICE 2,582,590

METHOD OF MAKING MAGNETIC MATERIAL

Martin H. Heeren and Marvin Camras, Chicago, Ill., assignors to Armour Research Foundation of Illinois Institute of Technology, Chicago, Ill., a corporation of Illinois No Drawing. Application August 15, 1946, Serial No. 690,837

1 Claim. (Cl. 117—169)

This invention relates to a magnetic record medium and more particularly to a record member which is particularly suited for use in magnetic recording and reproducing devices.

In the magnetic recording and reproduction of sound and other fluctuating signal energy, a traveling magnetizable record member is employed. Such a record member should essentially have two fundamental characteristics; namely, it should have a high coercive force and it should have relatively high tensile strength. In the past magnetic record members have been usually formed of steel, although record members have also been employed wherein a moving picture film has been used as a carrier and magnetizable powder has been coated on the surface.

Paper tapes have also been employed in which magnetizable powder has been coated on the surface of the paper.

One of the principal features and objects of the present invention is to provide a novel magnetic record member for magnetic recorders (and this term will be used throughout this case to designate either a magnetic recorder or a magnetic reproducer, or both) which is in the form of a fibrous absorbent base carrier impregnated with magnetite.

Another object of the present invention is to provide a novel method and means for forming an elongated record member for a magnetic recorder.

A further object of the present invention is to provide a novel method for forming an elongated magnetic record member in which a fibrous cellulose base carrier is impregnated with an aqueous solution of equivalent amounts of ferric and ferrous salts and is thereafter subjected to the action of an alkali.

Another and further object of the present invention is to provide a novel magnetic record member for magnetic recorders wherein a cotton thread is immersed in an aqueous solution of equivalent amounts of ferric and ferrous salts and is thereafter subjected to a boiling solution of sodium hydroxide.

Another and still further object of the present invention is to impregnate a thread or tape of fibrous collulosic material with an aqueous solution of equivalent amounts of ferric and ferrous salts, thereafter impregnating the material with an alkali, drying it and coating it with a flexible coating composition such, for example, as a suitable plasticized lacquer.

The novel features which we believe to be characteristic of our invention are set forth with particularity in the appended claim. Our invention itself, however, both as to its organization, chemical composition and processing, together with further objects and advantages thereof, may best be understood by reference to the following description:

One particular embodiment of the present invention includes the processing of a cotton thread. More particularly, a solution is made up of sodium hydroxide and potassium nitrate dissolved in water and then brought to a boil. A second solution is made up of hydrous ferrous sulphate which is dissolved in water. The cotton thread is first bathed in the ferrous sulphate solution so as to impregnate the cotton thread with the ferrous sulphate. The thread is thereafter placed in a boiling solution of the sodium hydroxide and potassium nitrate and kept there for about two hours, which causes a precipitation of magnetite in the thread. Thereafter the thread is dried. Finally, it is coated with a flexible coating composition such, for example, as a suitable plasticized lacquer. The thread is given its final finish by drawing it through a die to give a smooth round thread. This resulting thread has been found to be an exceptionally fine magnetic record medium for magnetic recorders, and has further been found to have a coercive force in the neighborhood of 175 oersteds.

A second embodiment of the present invention includes immersing a paper tape in a bath of ferrous acetate and thereafter bathing it in a bath of sodium hydroxide and potassium nitrate which is preferably boiling during the time the paper tape is immersed therein. After the paper tape has been dried it will be found that magnetite having very small grain size is dispersed throughout the fibrous tape. If desired, the paper tape may be thereafter coated with a flexible coating composition such as a suitably plasticized lacquer.

A third embodiment of the present invention includes impregnating a fibrous cellulose base material, such as a cotton thread or a paper tape, with an aqueous solution of equivalent amounts of ferrous and ferric salts. The thread or tape which has been so bathed is then immersed in an alkali bath. The paper tape or cotton thread thus absorbs the hydrous ferro-ferric oxide which is precipitated by the alkali. If the alkali is a boiling solution it has been found that the ferro-ferric oxide is fixed onto the fibrous cellulose base (the thread or tape) more firmly.

As the term "magnetite" is used herein, it refers to $Fe_3O_4$ in either its natural state or in its synthetic form.

In summarizing the generic aspects of the present invention, it may be said that the important generic feature is to form magnetite in and on the fibers of the absorbent base material rather than to take previously formed magnetite and coat or bind it to the base. This may be accomplished by impregnating the carrier with an aqueous solution of a ferrous salt and thereafter treating it with an alkali solution containing an oxidizing agent, or by impregnating the base with a solution of substantially equivalent amounts of ferrous and ferric salts and treating it with an alkali. As a result of this process a magnetic oxide of iron will be precipitated in and on the fibers of the carrier or base material.

While the preferred form of fibrous absorbent base is a cellulosic material, other fibrous base materials may be used, such as silk, wool and other protein base materials, as well as synthetic fibrous materials such as fibrous or absorbent forms of nylon or copolymers of vinyl chloride and vinyl acetate.

While we have described certain particular embodiments of our invention, it will of course be understood that we do not wish to be limited thereto, since many modifications may be made, and we, therefore, contemplate by the appended claim to cover all such modifications as fall within the true spirit and scope of our invention.

We claim as our invention:

The method of making a permanent magnet material which includes impregnating a fibrous organic absorbent base material with ferrous sulphate and then placing it in a boiling solution of sodium hydroxide having potassium nitrate therein.

MARTIN H. HEEREN.
MARVIN CAMRAS.

REFERENCES CITED

The following references are of record in the file of this patent:

UNITED STATES PATENTS

| Number | Name | Date |
|---|---|---|
| 802,928 | Fireman | Oct. 24, 1905 |
| 1,949,840 | Languepin | Mar. 6, 1934 |
| 2,035,527 | Brown | Mar. 31, 1936 |

FOREIGN PATENTS

| Number | Country | Date |
|---|---|---|
| 11,695 | Great Britain | May 20, 1914 |
| 324,099 | Great Britain | Jan. 17, 1930 |
| 466,023 | Great Britain | Nov. 18, 1936 |

OTHER REFERENCES

Welo et al., Transformation of Magnetite into Hermatite, Phil. Mag. 1925, vol. 50, page 400.

Mellor's Modern Inorganic Chemistry, Revised Ed. Publ. 1939 by Longmans, Green & Co., New York, N. Y., page 815.